June 2, 1925.
M. A. SAGEN
CONVERTIBLE HITCH DEVICE
Filed April 27, 1923
1,540,426
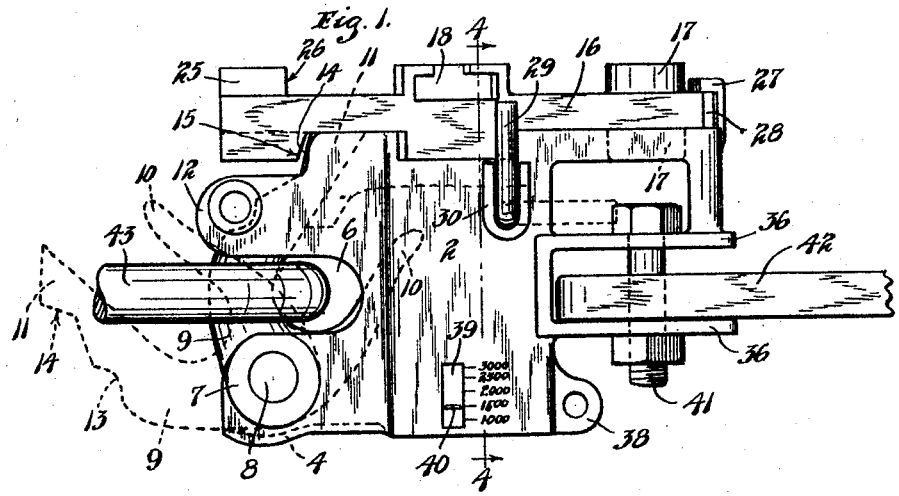
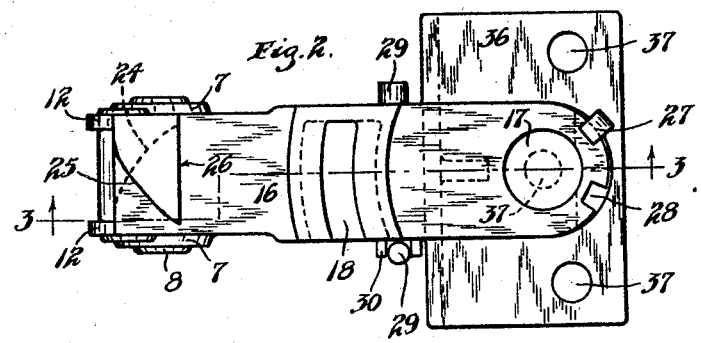
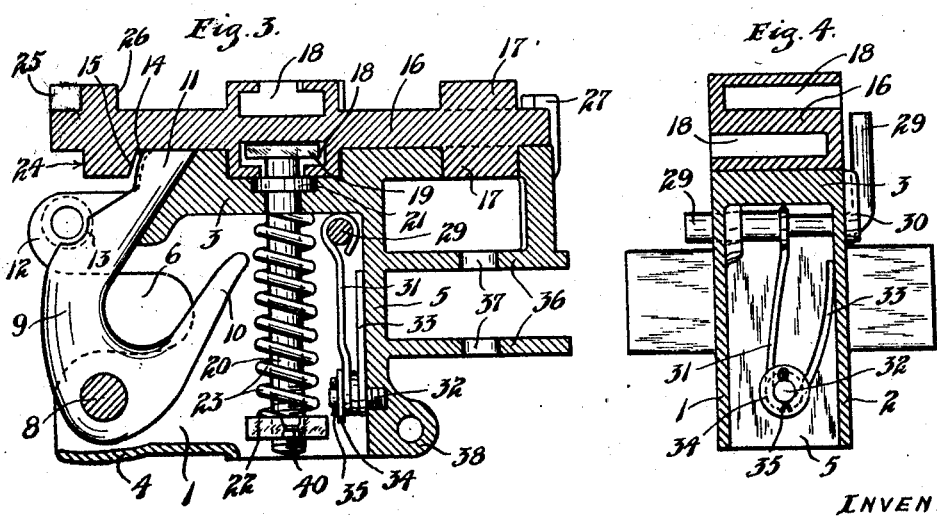
INVENTOR
MARTIN A. SAGEN.
BY HIS ATTORNEY.
James F. Williamson Patented June 2, 1925.

1,540,426

UNITED STATES PATENT OFFICE.

MARTIN A. SAGEN, OF EDMORE, NORTH DAKOTA, ASSIGNOR OF ONE-THIRD TO HILBERT J. NYHUS, OF EDMORE, NORTH DAKOTA.

CONVERTIBLE HITCH DEVICE.

Application filed April 27, 1923. Serial No. 635,000.

*To all whom it may concern:*

Be it known that I, MARTIN A. SAGEN, a citizen of the United States, residing at Edmore, in the county of Ramsey and State of North Dakota, have invented certain new and useful Improvements in Convertible Hitch Devices; and I do hereby declare the following to be a full, clear, and exact description of the invention, such as will enable others skilled in the art to which it appertains to make and use the same.

This invention relates to a draft device or a tractor hitch or coupling adapted to connect a tractor with some other member which is drawn thereby. Such devices are now commonly used on tractors pulling plows and other tools. It is desirable at times to have a positive coupling device and at other times to have a releasable coupling which will uncouple when a certain stress is placed thereon. It is also desirable to have a hitch which will automatically couple by merely being moved against the coupling member of the device which is drawn. A movable member is provided in the hitch which moves to permit the release of the drawn member and said movable member is held down or in position by strong spring pressure. On account of this strong spring pressure it is desirable to have a lighter spring to permit movement of said member when automatic coupling takes place.

It is an object of this invention, therefore, to provide a coupling device which can be converted into either a positive or a releasable coupling and one which has a member movable in one direction when the coupling releases and which is movable in another direction to permit automatic coupling of the device.

It is a further object of the invention to provide a draft device having such a member movable in two directions and which is reversible so that in one position it can move laterally for automatic coupling and form a positive hitch and in its other position it can move laterally for automatic coupling also to form a releasable hitch.

These and other objects and advantages of the invention will be fully set forth in the following description made in connection with the accompanying drawings in which like reference characters refer to the same parts throughout the different views, and in which, Fig. 1 is a view in side elevation of the device, a different position of some parts being shown in dotted lines;

Fig. 2 is a top plan view thereof;

Fig. 3 is a vertical section taken on the line 3—3 of Fig. 2, as indicated by the arrows; and Fig. 4 is a view in vertical section taken on the line 4—4 of Fig. 1, as indicated by the arrows.

Referring to the drawings, the device comprises a casing which preferably is made of cast metal and comprises side walls 1 and 2 which are substantially parallel and a horizontal or top wall 3 as well as the bottom wall 4 and end wall 5. The side walls are formed at the front end with comparatively large horizontal and alined slots 6. Said walls are also provided at their bottom and front ends with lateral bosses 7 bored to receive a pivot pin 8 forming the pivot for a U-shaped latch member 9 having the upwardly projecting arms 10 and 11. The side walls 1 and 2 also have forwardly projecting bossed portions 12 immediately above the slot 6 which are bored and adapted to receive a pin or bolt which will be positioned to be engaged by the arm 11 of the latch 9 to lock the latch in its closed position. The said latch is illustrated as having a notch or groove 13 therein adapted to contact with said bolt. The upper portion of the arm 11 is provided with a surface 14 which is substantially vertical when the latch is in closed position. When the latch is pulled forwardly with the draft device in use the surface 14 is adapted to impinge against the inclined surface 15 formed on a downwardly projecting lip at the forward end of a bar 16. This bar is generally of flat rectangular form and seats on the upper side of the top wall 3 of the casing and has adjacent its rear end cylindrical projections 17 at each side thereof which alternately are adapted to seat in a cylindrical hole formed in the rear end of the top wall 3. Intermediate of its ends the bar 16 is provided with open-ended T-shaped slots 18 at each side thereof which are curved and concentric with the center of the projections 17 and which are closed at one end and open at the other end, the open ends being at opposite edges of the bar. With the bar in place, one of the T-shaped slots 18 receives the head 19 of a bolt 20 which extends vertically through an aperture in the wall 3 and has a collar 21 thereon seating in a recess in the wall 3. The bolt is threaded at its lower end to receive an angular or square nut 22 and a strong compression coiled spring 23 surrounds the bolt and presses at one end against the nut 22 and at its other end against the square surface of the wall 3. The bar 16 has a transversely extending curved and inclined surface 24 at the forward end of the lip carrying surface 15 and said bar also has a lip at its opposite side which has a similar but oppositely disposed curved surface 25, the rear surface 26 of the latter lip being substantially vertical when the bar is in position. A lug 27 projects upwardly from the casing 1 and has a lip overhanging the top side of the bar 16 at the rear thereof and said bar is formed with a vertical slot 28 in its rear edge adapted to permit passage of the lug 27 when in alinement therewith. The side walls 1 and 2 of the casing are bored to receive a shouldered pin or short rod 29 having its smaller end bent substantially at a right angle and extending upwardly along the outside of the wall 2 which is provided with a U-shaped rib 30 in which said rod 29 seats. It will be noted that the upper end of the rod 29 is disposed adjacent therefor the bar 16. A spring 31 has an arm encircling the pin 29 and seated against the shoulder thereof between the walls 1 and 2 and said spring extends downward and has a plurality of coils disposed about a stud 32 screwed into the rear wall 5 and the other arm 33 of the spring bears against the inside of the wall 2. The spring is held on the stud 32 by a washer 34 secured by a split key 35 extending through said stud or by any other suitable means. It will be seen that the tension of the spring 31—33 tends to hold the upwardly extending arm of pin 29 against the side wall 2. The casing has horizontal flanges 36 projecting from the rear thereof which are provided with apertures 37 adapted to receive the securing bolt 41 attaching the draft device to the tractor, a portion of which is shown as 42. The casing is also provided with a rearwardly extending apertured lug 38 adapted to receive a chain for a purpose to be later described. The wall 1 is also provided with a slot 39 extending therethrough and the outer side of said wall is provided with graduations designated, as shown, with numbers from 1000 to 3000 and the nut 22 on its sides provided with edge portions 40 adapted to aline with the slot 39 and to co-operate with the graduations adjacent thereto.

In operation, the device will be attached to the tractor and this attachment, generally, will be permanent. The draft device can be readily detached when desired, however, by merely removing the bolt 41, and it will be noted that said bolts can be disposed in any of the holes 37, according to conditions. With the draft device so attached to the tractor, if it is desired to arrange the same to form a releasable hitch the bar 16 will be disposed as shown in Figs. 1 and 3. Assuming the device is in position with the latch 9 open, as shown in dotted lines in Fig. 1, the tractor can be backed against the member to be hitched thereto and the coupling member 43 of said member will then be guided into contact with the underside of the arm 10 of said latch. The latch will then be swung toward its closed position and the underside of the arm 11 will contact with the surface 24. Owing to the inclined form of its surface the bar 16 will be cammed to swing to one side and will thus contact the upstanding portion of the pin 29. This pin will be swung outwardly from the side wall 2 against the tension of the spring 31. As soon as bar 16 has swung to one side sufficiently to permit the passage of the arm 11, said arm will pass to the rear of the lip-carrying surfaces 24 and 15 and spring 31 will return the bar to its central position. During the sidewise swinging of the bar 16, the head 19 of the bolt 20 moves in the T-shaped slot 18. The draft device is now hitched in position for drawing the member 43. The spring 23 will be set at the tension desired by a previous adjustment of the bolt 20 and nut 22 and the stress at which the draft device will release to be indicated by the graduations on the wall 1. As illustrated in Fig. 1, the device is set to release at a pull approximately of 1500 pounds. When such stress occurs between the members 42 and 43, the surface 14 of the latch arm 11 will cam against the surface 15 of the bar 16 and said bar will be raised against the tension of spring 23 and the latch 9 will swing forward and release the member 43. If the device is to be arranged to form a permanent hitch the bar 16 will be reversed. The upstanding end of the pin 29 can be turned downwardly to substantially a right angle position, as shown in dotted lines in Fig. 1 and the pin will then ride on the surface of the rib 30. The bar 16 can now be lifted from the casing and turned over. The other slot 18 will now receive the head 19 of bolt 20 and surfaces 25 and 26 will be in position for engagement by the surface 14 of latch arm 11. The device can be coupled, as above described, the inner surface of arm 11 contacting surface 25 and camming the bar to one side. The surface 14 will then be in position to contact the surface 26. As the latter surface is substantially vertical and the surface 14 is also substantially vertical, there can be no cam action tending to raise the bar 16 and the hitch will then act as a positive hitch. If it be desired at any time to convert the hitch temporarily from the releasable hitch to a permant hitch, this can be done by placing a bolt through the lugs 12 and the latch then cannot release. The lug 27 is provided to prevent the bar 16 jumping out of the position when the same is knocked to one side in the coupling operation. When it is desired to reverse the bar the same is swung to bring the slot 28 into alinement with the lug 27 when the bar can be lifted.

The draft device will generally be used with an engine-driven tractor. However, it is now common to plow with a gang of plows with eight or more horses. When plowing with such a large team, if one of the plows strikes a large stone, stump, or other obstruction, the beam of the plow is often bent or sprung or other damage caused before the team can be stopped. It is desirable at such times to use a releasable hitch with the plows and the device of the present invention can be thus used. The lug 38 is provided and when the device is used with a horse-drawn plow or other tool, a chain about two feet long will be connected through the lug 38 and to the connecting member 43 which is drawn by the draft device. When an obstruction is encountered the device will release. The team always can be stopped after a step or two and, in fact, become trained to stop so that by the time the slack-up in the chain is taken up they will be brought to a stop and no damage will be done to the plows.

From the above description it is seen that applicant has provided a simple and efficient draft device which can be easily automatically coupled and quickly converted from a releasable to a positive hitch. It has been found in practice that the strong spring 23 is too stiff to permit convenient automatic coupling, and for this reason the spring 31 was provided and such coupling affected by a lateral movement of the bar 16 rather than by a vertical movement thereof. The casing and other parts can conveniently be made as castings and the parts are adapted for rugged form and use.

It will, of course be understood, that various changes may be made in the form, details, arrangement and proportions of the parts without departing from the scope of applicant's invention, which, generally stated, consists in the matter shown and described and as set forth in the appended claims.

What is claimed is:

1. A draft device comprising a casing, a latch pivoted at one end thereof, a member mounted to aline and engage with said latch, said member being movable in two directions substantially at right angles to each other into positions out of engagement with said latch, and resilient means resisting movement of said latch in both directions.

2. The structure set forth in claim 1, said member being reversible and having means at opposite sides thereof for alternate engagement with said latch, one of which is adapted to co-act with said latch as a releasing cam means and the other of which locks with said latch and prevents movement of said member in one direction.

3. The structure set forth in claim 1, said members having means on opposite sides thereof for alternate engagement with said latch to form laterally diagonal cam surfaces whereby movement of the latch will cause said member to move in a lateral direction.

4. A draft device comprising a casing, a latch pivoted at one end thereof, a reversible member at one side of said casing pivoted adjacent one end for lateral movement and also mounted for vertical movement, means at opposite sides of said member at the other end thereof for alternately engaging said latch adapted to form either a reversible or a permanent hitch, a spring-pressed headed bolt in said casing and curved T-shaped slots at each side of said member adapted alternately to engage the head of said bolt and prevent movement of said member when disposed to form a releasable hitch.

5. The structure set forth in claim 4, means at opposite sides of said member alternately adapted to be engaged by said latch to swing said member laterally, and a spring-pressed means resisting such lateral swinging movement.

6. A draft device comprising a casing having vertical substantially parallel walls and a substantially horizontal wall, a U-shaped latch pivoted adjacent its bottom at one end of the casing, a headed bolt disposed in an aperture in said horizontal wall, a compression spring surrounding said bolt and engaging said horizontal wall, a nut adjustable on said bolt engaged by the other end of said spring, a member pivoted adjacent the other end of said casing for lateral swinging movement disposed on said horizontal wall and having a curved open ended T-slot concentric with the pivot thereof in which the head of said bolt is disposed, spring pressed means resisting lateral swinging movement of said member, and cam means at the front of said member adapted to be engaged by said latch in swinging to closing position for swinging said member laterally, said member having other cam means adapted to be engaged by said latch in moving toward open position whereby when sufficient stress is placed on said latch said spring will be compressed, said member raised and the latch released.

7. The structure set forth in claim 6, said spring-pressed means comprising a rod extending horizontally through the casing having an arm bent upwardly along side of said member, and a spring secured in said casing and connected to said pin to resist movement thereof by said member.

8. A draft device having in combination, a casing, a forwardly and rearwardly swinging latch therein, and a reversible member carried by said casing, said member having means at opposite sides for engagement by said latch to swing the member laterally and also having means at opposite sides for engagement by said latch adapted to form, respectively, a releasable hitch or a positive hitch.

In testimony whereof I affix my signature.

MARTIN A. SAGEN.